United States Patent [19]

Dunn et al.

[11] Patent Number: 4,488,290

[45] Date of Patent: Dec. 11, 1984

[54] DISTRIBUTED DIGITAL EXCHANGE WITH IMPROVED SWITCHING SYSTEM AND INPUT PROCESSOR

[75] Inventors: James E. Dunn, San Diego; Colin Bradbury, La Jolla; Kenneth R. Holmes, La Jolla; Stephen W. Treadwell, La Jolla, all of Calif.

[73] Assignee: M/A-Com Linkabit, Inc., San Diego, Calif.

[21] Appl. No.: 405,103

[22] Filed: Aug. 4, 1982

[51] Int. Cl.³ .......................................... H04Q 11/04
[52] U.S. Cl. ...................................... 370/66; 370/58; 370/67; 370/100
[58] Field of Search .................... 370/66, 68, 100, 58, 370/67; 375/114, 116

[56] References Cited

U.S. PATENT DOCUMENTS

| | | | |
|---|---|---|---|
| 3,644,679 | 2/1972 | Tellegas | 179/15 |
| 3,648,254 | 3/1972 | Beausoleil | 340/172.5 |
| 3,735,049 | 5/1973 | Buchner et al. | 370/68 |
| 3,883,855 | 5/1975 | Brightman et al. | 340/172.5 |
| 3,922,643 | 11/1975 | Poole | 340/172.5 |
| 3,959,588 | 5/1976 | Kelly et al. | 370/100 |
| 3,997,874 | 12/1976 | Kelly et al. | 340/172.5 |
| 4,092,728 | 5/1978 | Baltzer | 364/900 |
| 4,093,825 | 6/1978 | Gladstone et al. | 370/100 |
| 4,093,827 | 6/1978 | Charransol et al. | 370/66 |
| 4,156,905 | 5/1979 | Fassbender | 364/200 |
| 4,287,590 | 9/1981 | Boute et al. | 370/67 |
| 4,392,224 | 7/1983 | Mori et al. | 370/68 |

Primary Examiner—Douglas W. Olms
Attorney, Agent, or Firm—Baker, Maxham, Callan & Jester

[57] ABSTRACT

A distributed digital exchange for completing a communications link between a selected originating channel and one or more selected destination channels. The exchange includes an input bus containing a given number of input lines, with each input line for conveying a time-division-multiplexed plurality of time-division-multiplexed input signals, with each data bit position of every frame of each input signal defining a discrete originating channel; a clock system for providing timing signals for defining frames and bit positions corresponding to the frames and bit positions of the input signals; an exchange bus containing at least the given number of lines for conveying the input signals; a novel input processor for receiving the input signals, for synchronizing the input signals in response to the timing signals and for transferring each received plurality of input signals from a selected line of the input bus to a selected line of the exchange bus; an output bus containing at least the given number of output lines, with each output line for conveying a time-division-multiplexed output signal, with each data bit position of every frame of each output signal defining a discrete destination channel; a plurality of novel switching systems, each of which includes circuits for routing data from any selected data bit position in a frame of any selected time-division-multiplexed input signal on a selected line of the exchange bus to one or more selected data bit positions in a frame of any selected time-division-multiplexed output signal; and a controller for controlling the selections.

14 Claims, 11 Drawing Figures

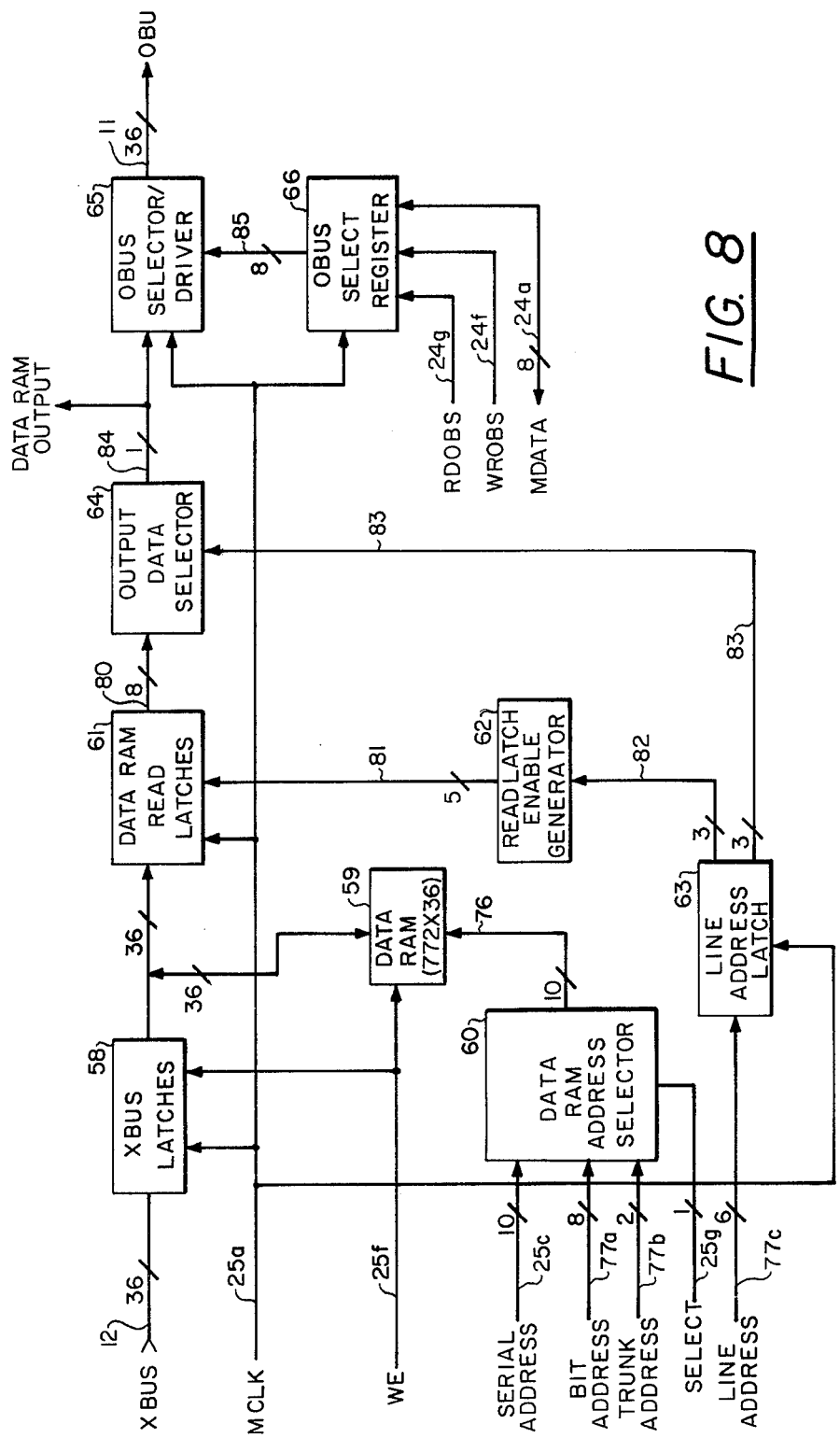

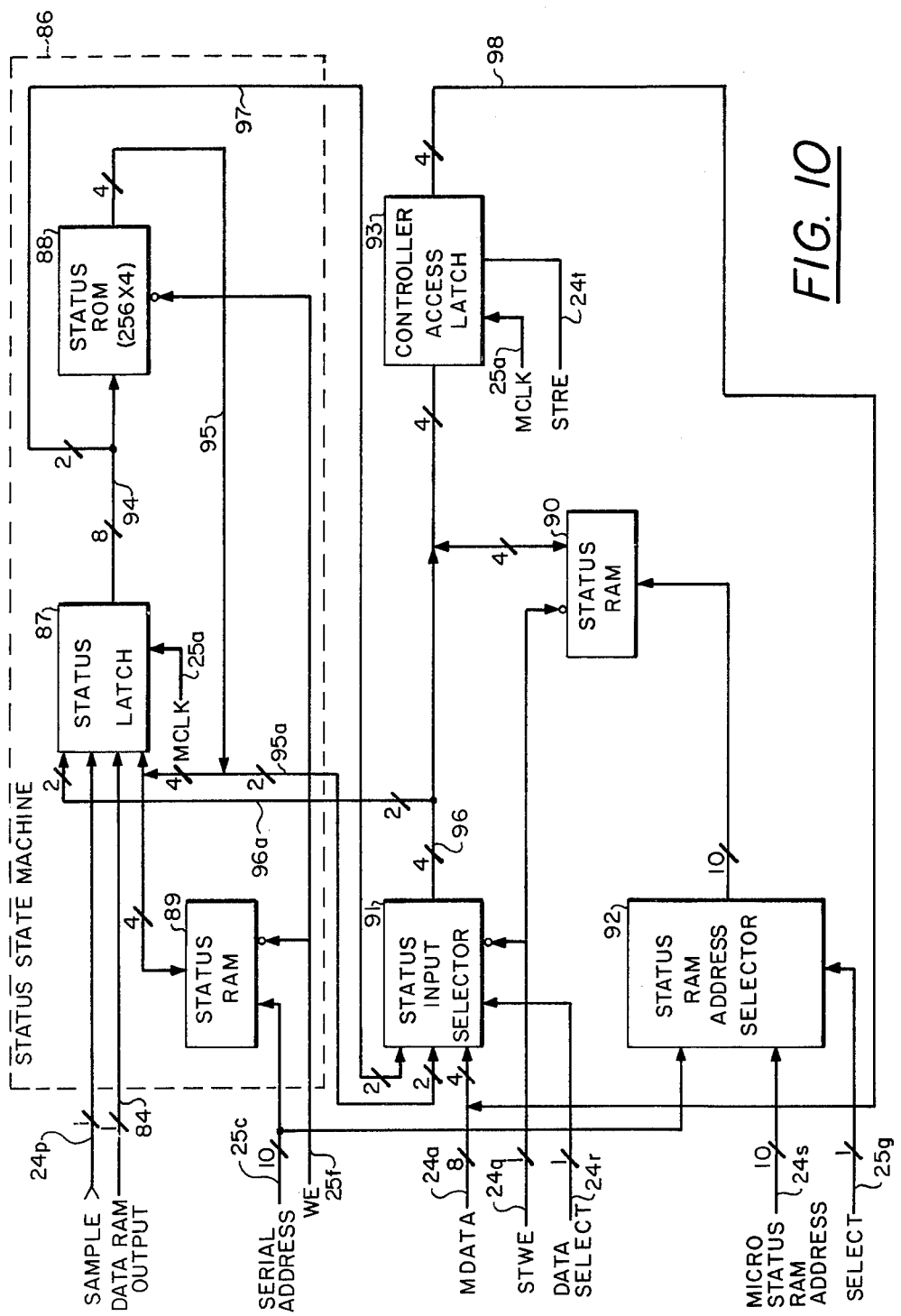

DISTRIBUTED DIGITAL EXCHANGE WITH IMPROVED SWITCHING SYSTEM AND INPUT PROCESSOR

BACKGROUND OF THE INVENTION

The present invention generally pertains to electronic communications and is particularly directed to improvements in distributed digital exchanges and to improvements in switching systems and input processors for distributed digital exchanges.

A distributed digital exchange is employed for completing a communications link between a selected originating channel and one or more destination channels. Discrete originating channels are defined by the respective data bit positions in every frame of a time-division-multiplexed input signal. Discrete destination channels are defined by the respective data bit positions in every frame of a time-division-multiplexed output signal. Several different communication links can be completed by the distributed digital exchange during each frame.

Switching systems are employed for routing data from any selected data bit position in a frame of a time-division-multiplexed input signal to one or more selected data bit positions in a frame of a time-division-multiplexed output signal.

Input processors are employed for synchronizing a time-division-multiplexed input signal received from an input line in response to timing signals that define frame and data bit positions.

SUMMARY OF THE INVENTION

The distributed digital exchange of the present invention essentially includes an input bus, a clock system, an exchange bus, an input processor and an output bus, and is characterized by a plurality of switching systems and a controller that controls various selections and designations within the switching systems and the input processor.

The input bus contains a given number of input lines. Each input line is adapted for conveying either a time-division-multiplexed input signal or a time-division-multiplexed plurality of time-division-multiplexed input signals. Each data bit position of every frame of each input signal defines a discrete originating channel.

The clock system provides timing signals for defining frames and bit positions corresponding to the frames and bit positions of the input signals.

The exchange bus contains at least the given number of lines for conveying the input signals.

The input processor receives the input signals, synchronizes the input signals in response to the timing signals, and transfers each received input signal from a selected line of the input bus to a selected line of the exchange bus.

The output bus contains at least the given number of output lines. Each output line is adapted for conveying a time-division-multiplexed output signal. Each data bit position of every frame of each output signal defines a discrete destination channel.

Each of the switching systems is adapted for routing data from any selected data bit position in a frame of any selected time-division-multiplexed input signal on a selected line of the exchange bus to one or more selected data bit positions in a frame of any selected time-division-multiplexed output signal.

The present invention further provides a novel switching system for effecting such routing of data. The novel switching system of the present invention is included in the preferred embodiment of the distributed digital exchange of the present invention.

The novel switching system of the present invention includes a data RAM (random access memory), an address selector for the data RAM, a control RAM, an address circuit for the control RAM, a read latch and a selection circuit.

The data RAM is coupled to the exchange bus for storing all of the input signals from all of the exchange bus lines during write intervals defined by a first timing signal from the clock system.

The address selector for the data RAM selects write address signals for addressing positions in the data RAM for storing data from each data bit position in every frame of each input signal and provides the selected write address signals to address the data RAM during the write intervals. This address selector also selects a designated read address signal for addressing a selected position in the data RAM corresponding to a selected originating channel corresponding to a selected data bit position in every frame of a selected input signal, and provides the designated read address signal to address the data RAM during a read interval defined by the first timing signal to thereby read data from the data RAM.

The control RAM stores the designated address signal.

The address circuit for the control RAM addresses the control RAM for storing the designated read address signal in one or more positions corresponding to one or more selected data bit positions in every frame of a selected output signal corresponding to one or more selected destination channels. The address circuit for the control RAM addresses the positions of the control RAM for read out in a sequence corresponding to the sequence of data bit positions in every frame of the output signals.

The control RAM is coupled to the address selector for the data RAM for providing the designated read address signal to the address selector for causing data to be read from the data RAM during intervals corresponding to the one or more selected data bit positions in every frame of the selected output signal corresponding to the one or more selected destination channels.

The read latch latches the data read from the data RAM into the one or more selected data bit positions in every frame of the selected output signal.

The selection circuit selects the line of the output bus that contains the selected one or more destination channels in the selected one or more bit positions of the output signal on the selected output bus line and transfers the latched data read from the data RAM onto the selected output bus line.

The switching system can route data from several different selected data bit positions during each frame.

The switching system of the present invention has the feature of being readily controllable by a controller, such as a microprocessor, for providing versatile routing of data between respective selected data bit positions of selected time-division-multiplexed input and output signals. The switching system of the present invention does not include the selection circuit when the switching system is used for routing data to selected data bit positions in a frame of a dedicated time-division-multiplexed output signal.

Within the distributed digital exchange of the present invention, each of the plurality of switching systems operates independently and can route data from any of the input signals on any of the input lines of the data bus to any of the output signals on any of the output lines of the output bus. Accordingly the operation of the exchange is not impaired should any given switching system be operated at full switching capacity and thereby be unavailable. Also the operation of the exchange is unaffected if any given switching system should happen to become inoperable. Inoperable switching systems can be replaced without affecting the operation of the exchange. The controller selects and designates whatever addresses are required within the operable and available switching systems to accomplish the desired routing between the selected originating and destination channels.

The present invention further provides a novel input processor for synchronizing a time-division-multiplexed input signal in response to timing signals that define frame and data bit positions. The novel input processor of the present invention is included in the preferred embodiment of the distributed digital exchange of the present invention.

The novel input processor of the present invention includes a ring buffer, and an alignment state machine.

The ring buffer delays the input signal received from the selected input line and transfers the delayed input signal to the selected line of the exchange bus.

The alignment state machine examines the pattern of bits occurring in corresponding bit positions of successive frames of the delayed signal during frame synchronization pulse intervals defined by a first timing signal in relation to a predetermined bit pattern, and provides slip signals to the ring buffer for regulating the delay in accordance with such examination until the delayed signal is synchronized with the first timing signal.

The ring buffer includes a buffer RAM for temporarily storing the received input signal in a variable number of successively addressed bit positions; a read/write control circuit for reading the delayed input signal from the buffer RAM and then writing the received input signal in the buffer RAM during each interval during which a bit position of the buffer RAM is addressed; an address counter for providing a variable count of addresses for successively addressing the variable number of bit postions of the buffer RAM repetitively at the bit position rate of the input signal as defined by a second timing signal; and a count adjustment circuit responsive to each slip signal for varying the count provided by the address counter to thereby vary the number of bit positions in the buffer RAM that are respectively addressed. Accordingly, the delay provided by the ring buffer is determined by the count provided by the address counter.

When the input lines are adapted for conveying a time-division-multiplexed plurality of time-division-multiplexed input signals, the input processor includes a plurality of such ring buffers corresponding in number to the plurality of input signals for respectively delaying each of the plurality of input signals received from the input line.

Additional features of the present invention are discussed in connection with the description of the preferred embodiment.

BRIEF DESCRIPTION OF THE DRAWING

FIGS. 4A through 4F are waveforms of various timing and control signals provided by the signal generator of FIG. 3.

FIG. 8 is a block diagram of the output processor included in the switching system of FIG. 2.

FIG. 10 is a block diagram of a second portion of the control subsystem included in the switching system of FIG. 2.

DESCRIPTION OF THE PREFERRED EMBODIMENT

Figure 1:
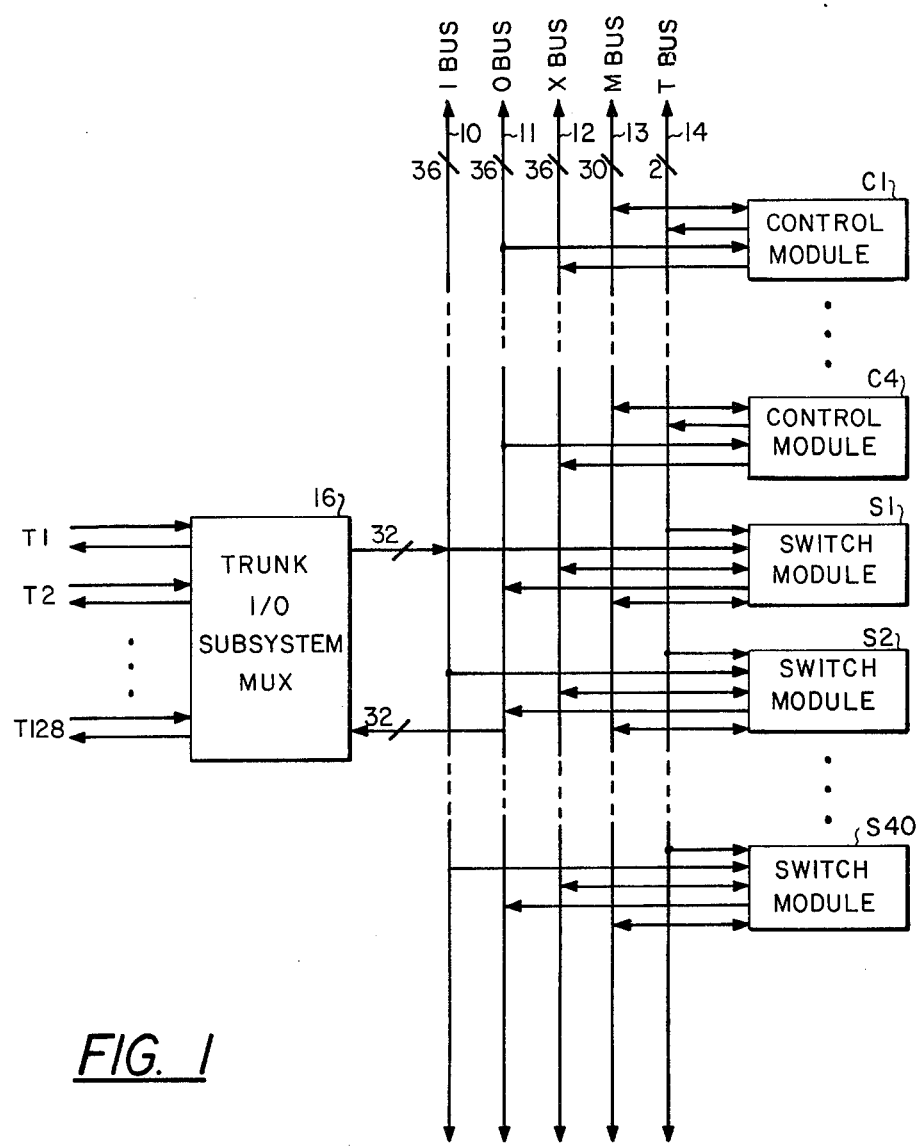
FIG. 1 is a block diagram of a preferred embodiment of the distributed digital exchange of the present invention.

A preferred embodiment of a distributed digital exchange for completing a communications link between a selected originating channel and one or more selected destination channels, in accordance with the present invention is shown in FIG. 1. The exchange includes a 36-line input bus (IBUS) 10, a 36-line output bus (OBUS) 11, a 36-line exchange bus (XBUS) 12, a 30-line microprocessor bus (MBUS) 13 and a 2-line timing bus (TBUS) 14.

Each of thirty-two of the input lines conveys a time-division-multiplexed (TDM) plurality of four TDM input signals received from a trunk input/output subsystem multiplexer (MUX) 16. The MUX 16 provides the four TDM input signals on each of thirty-two of the input lines 10 by multiplexing TDM input signals received over one-hundred-twenty-eight trunks T1, T2, . . . T128 in groups of four. Each data bit position of every frame of each input signal defines a discrete originating channel. However, a discrete operating channel may be defined by a plurality of different bit positions during each frame. In the preferred embodiment there are twenty-four channels on each trunk T, with each channel having eight data bit positions during each frame. Thus each trunk T contains a TDM input signal containing 192 (8×24) data bit positions and one framing bit position. Accordingly, there are 772 (4×193) bit positions during each complete frame on each line of the IBUS 10 and during each complete frame on each line of the OBUS 11.

A clock contained in a control module C provides timing signals on the timing bus 14 for defining frame and bit positions corresponding to the frames and bit positions of the TDM input signals.

Each of the thirty-two lines of the OBUS 11 conveys a time-division-multiplexed plurality of four TDM output signals, with each data bit position of every frame of each output signal defining a discrete destination channel. The MUX 16 provides TDM output signals on each of the one-hundred-twenty eight trunks by demultiplexing the thirty-two output signals on thirty-two lines of the OBUS 11 in groups of four.

Up to forty switch modules S1, S2, ... S40 are connected to the IBUS 10, the OBUS 11, the XBUS 12, the MBUS 13 and the TBUS 14. Forty discrete switching systems are respectively contained within the switch modules S1, S2. ... S40. Each of the switching systems is adapted for routing data from any selected data bit position in a frame of any selected TDM input signal to one or more selected data bit positions in a frame of any selected TDM output signal.

Four control modules C1, ... C4 are connected to the OBUS 11, the XBUS 12, the MBUS 13 and the TBUS 14. Each of the control modules contains a controller for controlling the various selections accomplished by the switching systems. A single controller has the capacity of controlling selections for all forty switching modules. Each controller is embodied in a microprocessor.

The exchange of FIG. 1 is used as a network interchange for a digital communication network.

Figure 2:
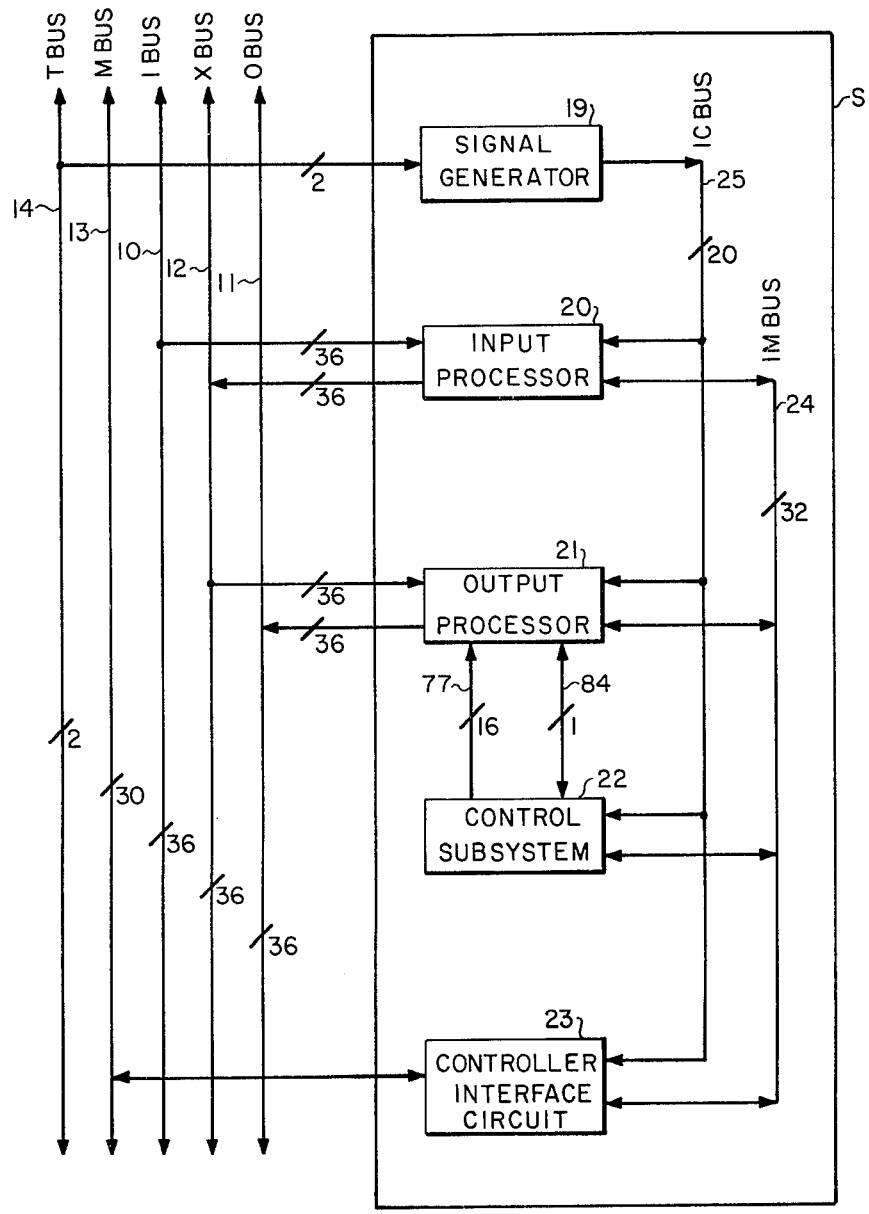
FIG. 2 is a block diagram of a switching system contained in one of the switch modules included in the exchange of FIG. 1, and further shows an input processor also contained within the switch modules.

Referring to FIG. 2, each switch module S includes a signal generator 19, an input processor 20, an output processor 21, a control subsystem 22, a controller interface circuit 23, a 32-line internal microprocessor bus (IMBUS) 24 and a 20-line internal control bus (ICBUS) 25.

The signal generator responds to the timing signals on the TBUS 14 by providing timing, address and control signals for the components of the switch modules on the ICBUS 25.

The input processor 20 receives TDM input signals from one selected line of the IBUS 10, synchronizes the received TDM input signals in response to timing signals provided by the signal generator 19, and transfers the received TDM input signals from the selected line of the input bus 10 to a selected line of the exchange bus 12.

The output processor 21 and the control subsystem 22 combine to perform the switching function of the switching module S, to wit: routing data from any selected data bit position in every frame of any selected TDM input signal on the XBUS 12 to one or more selected data bit positions in every frame of any selected TDM output signal on the OBUS 11.

The controller interface circuit 23 responds to control signals placed on the MBUS 13 by the controller in one of the control modules C1 ... C4 (FIG. 1) by providing selection control signals for the components of the switch modules on the IMBUS 24. The controller interface circuit 23 also transfers status signals indicating the activity and break status of the communication links completed by the switching system to the MBUS 13 for transfer to the controller in the control module C. These status signals are provided to the controller interface circuit 23 over the IMBUS 24 from the control subsystem 22.

Figures 3, 4:
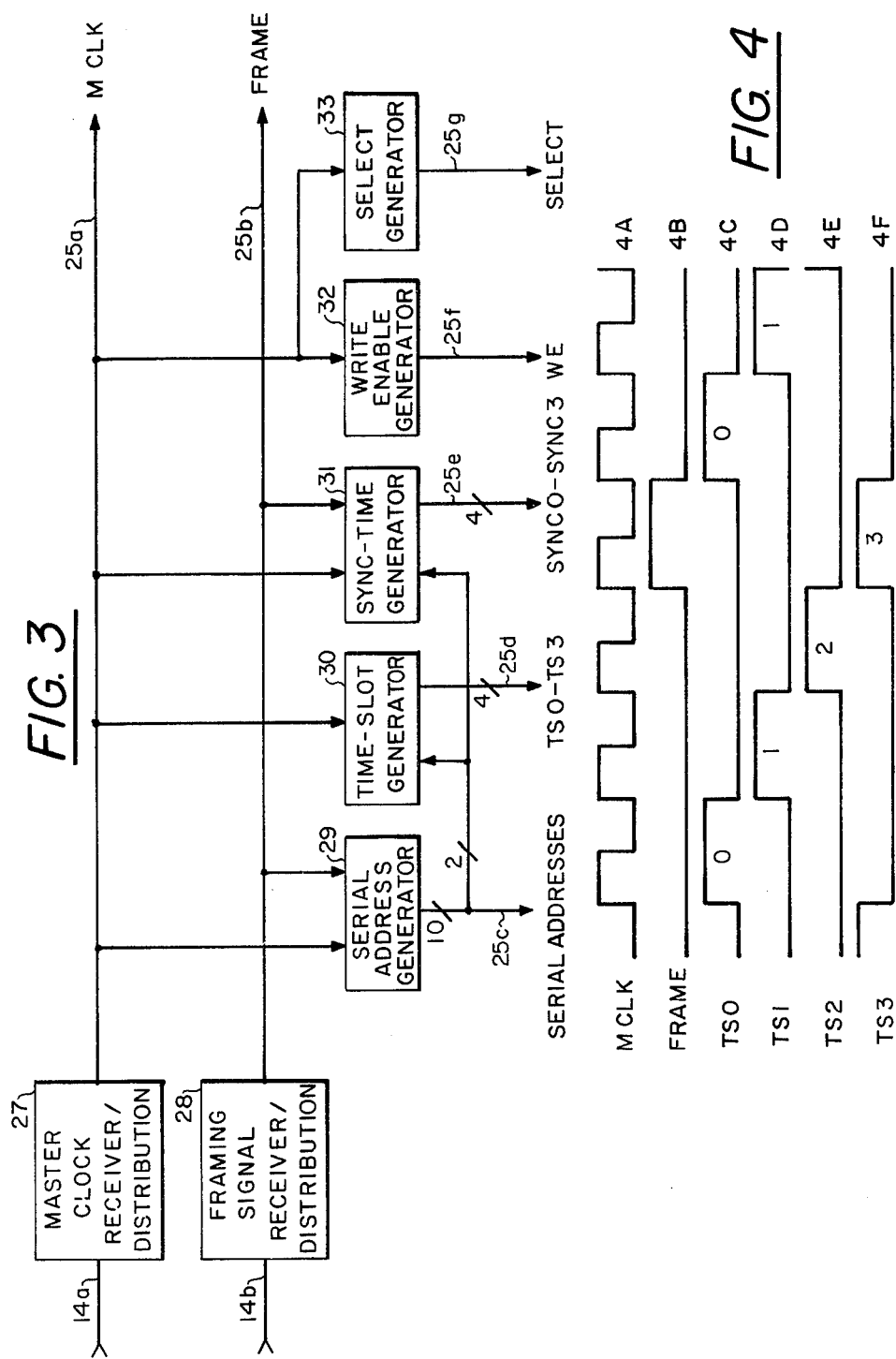
FIG. 3 is a block diagram of the signal generator included in the switching system of FIG. 2.

Referring to FIG. 3, each timing generator 19 includes a master clock receiver/distribution circuit 27, a framing signal receiver/distribution circuit 28, a serial address generator 29, a time slot generator 30, a sync-time generator 31, a write enable generator 32 and a select generator 33.

The master clock receiver/distribution circuit 27 responds to a master clock signal from the system clock 19 via TBUS line 14a by providing a master clock (MCLK) timing signal on ICBUS lines 25a. The MCLK timing signal is a square wave, having a frequency corresponding to the frequency of occurrence of the data bit positions in the TDM input signals on the IBUS 10. The MCLK timing signal is shown in FIG. 4A.

The framing signal receiver/distribution circuit 28 responds to a master framing signal from the system clock 19 via TBUS line 14b by providing a FRAME timing signal on ICBUS line 25b.

FRAME timing signal consists of a periodically occurring pulse having a duration equal to the period of the MCLK timing signal on line 25a and occurring at a rate corresponding to the frame rate of the TDM input signals on the IBUS lines 10. The FRAME timing signal is shown in FIG. 4B.

The serial address generator 29 is a counter that counts the pulses in the MCLK timing signal on line 25a to provide ten-bit serial address signals on ten parallel lines 25c. The counter of the serial address generator 29 is reset in response to the FRAME timing signal on lines 25b and thereby provides 772 serial addresses of from 0 to 771 during each frame.

The time slot generator 30 is a decoder that responds to the MCLK timing signal on line 25a and to the two least significant bits of the ten-bit address signal provided on the lines 25c by providing four discrete time-slot timing signals TS0, TS1, TS2 and TS3 on four lines 25d. The waveforms of the time-slot timing signals TS0, TS1, TS2 and TS3 are shown in FIGS. 4C, 4D, 4E and 4F respectively. Each of these time-slot timing signals consists of a periodically occurring pulse having a duration equal to the period of the MCLK timing signal on line 25a and occurring at one-fourth the rate of the pulses of the MCLK timing signal. The time slot timing signals on the lines 25d are staggered as shown in FIGS. 4C-4F so that their respective pulses occur sequentially and thereby correspond to the respective time slots for the four time-division-multiplexed TDM input signals on each of the input lines of the IBUS 10.

The sync-time generator 31 is a decoder that responds to the MCLK timing signal on line 25a, to the FRAME timing signal on line 25b and to the two least significant bits of the ten-bit address signal on the lines 25c by providing four discrete sync timing signals SYNC0, SYNC1, SYNC2 and SYNC3 on four lines 25e. Each of the sync timing signals consists of a periodically occurring pulse having a duration equal to the period of the MCLK timing signal on line 25a and occurring at a rate of once per frame. The sync timing signals SYNC0, SYNC1, SYNC2 and SYNC3 are staggered so that their respective pulses occur sequentially and coincident with one group of corresponding time slot timing signals TS0, TS1, TS2 and TS3 during each frame.

The write enable generator 32 is a logic circuit that responds to the MCLK timing signal on line 25a by providing write enable (WE) control signals on line 25F for enabling various memories to be enabled for writing data at predetermined write intervals.

The select generator 33 is a logic circuit that responds to the MCLK timing signal on line 25a by providing a SELECT control signal on line 25g for controlling the operation of various multiplexers within the switching system at predetermined intervals.

Figure 5:
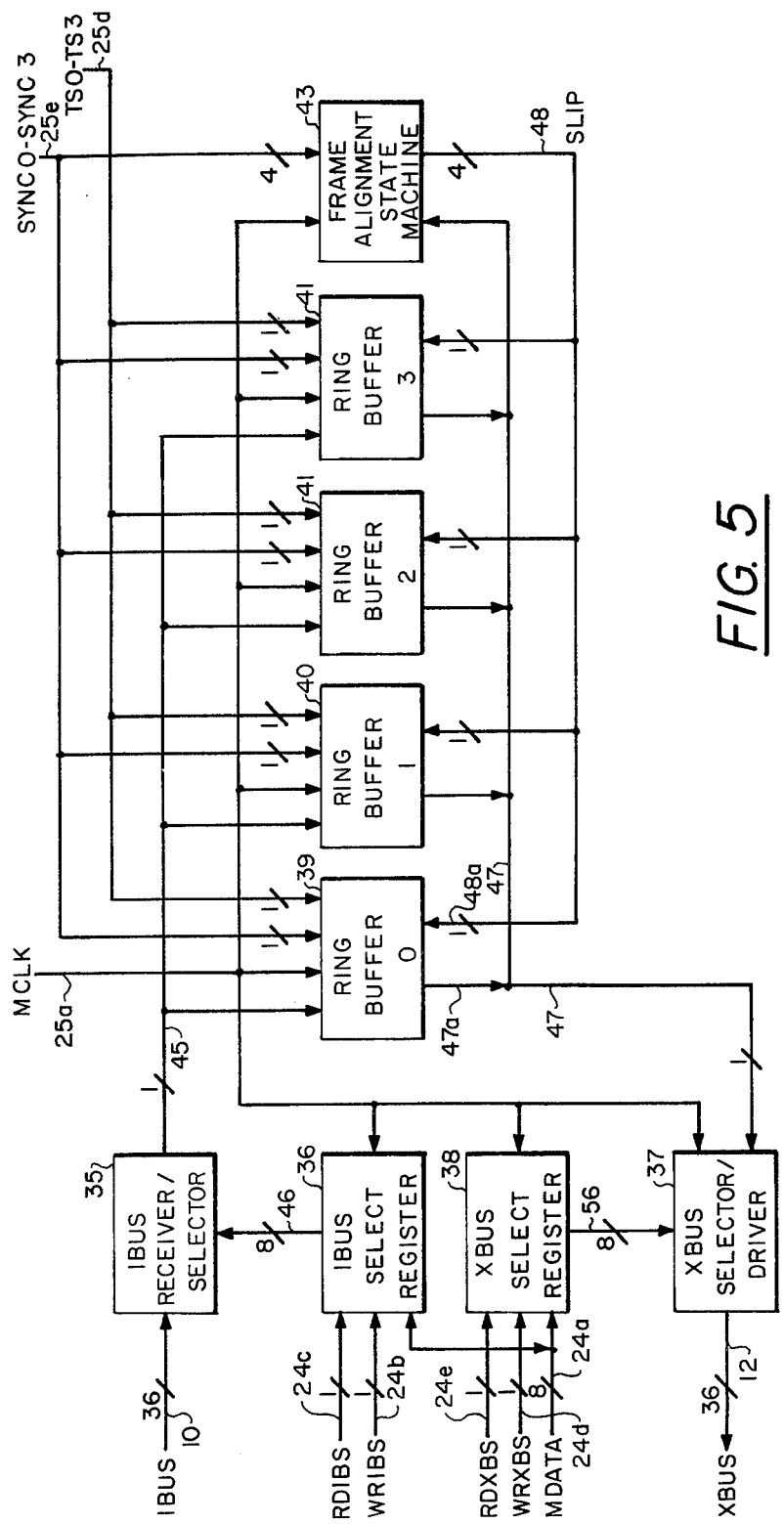
FIG. 5 is a block diagram of the input processor included in the diagram of FIG. 2.

Referring to FIG. 5, the input processor 20 includes an IBUS receiver/selector circuit 35, an IBUS select register 36, an XBUS selector/driver circuit 37, an XBUS select register 38, four ring buffers 39, 40, 41 and 42 and a frame alignment state machine 43.

The IBUS receiver/selector circuit 35 includes latches, decoders and a MUX for receiving a selected time-division-multiplexed plurality of four TDM input signals from a selected input line of the IBUS 10 and provides the selected plurality of four TDM input signals on line 45. The address of the selected input line is provided to the IBUS receiver/selector circuit 35 over eight lines 46 from the IBUS select register 36.

The IBUS select register 36 includes latches and a logic circuit for registering the address of the selected input line. The address of the selected input line is provided from the controller within the control module C that controls the switching module S and is latched into the register 36 from eight microprocessor data (MDATA) lines 24a of the IMBUS 24 in response to a write IBUS select register signal (WRIBS) from line 24b of the IMBUS 24. The register 36 may be read out to the controller over the MDATA line 24a in response to a read IBUS select register signal (RDIBS) from line 24b of the IMUS 24. The signals on the IMBUS 24 are communicated by the controller interface circuit 23 via the MBUS 13 to and from the controller in the control module C.

The four received time-division-multiplexed TDM signals on line 45 are respectively delayed by the four ring buffers 39, 40, 41 and 42 during their respective time slots as defined by the time-slot timing signals TS0-TS3 on line 25d. The delayed TDM input signals are provided on line 47 from the four ring buffers 39-42 to both the alignment state machine 43 and the XBUS selector/driver circuit 37.

Figure 6:
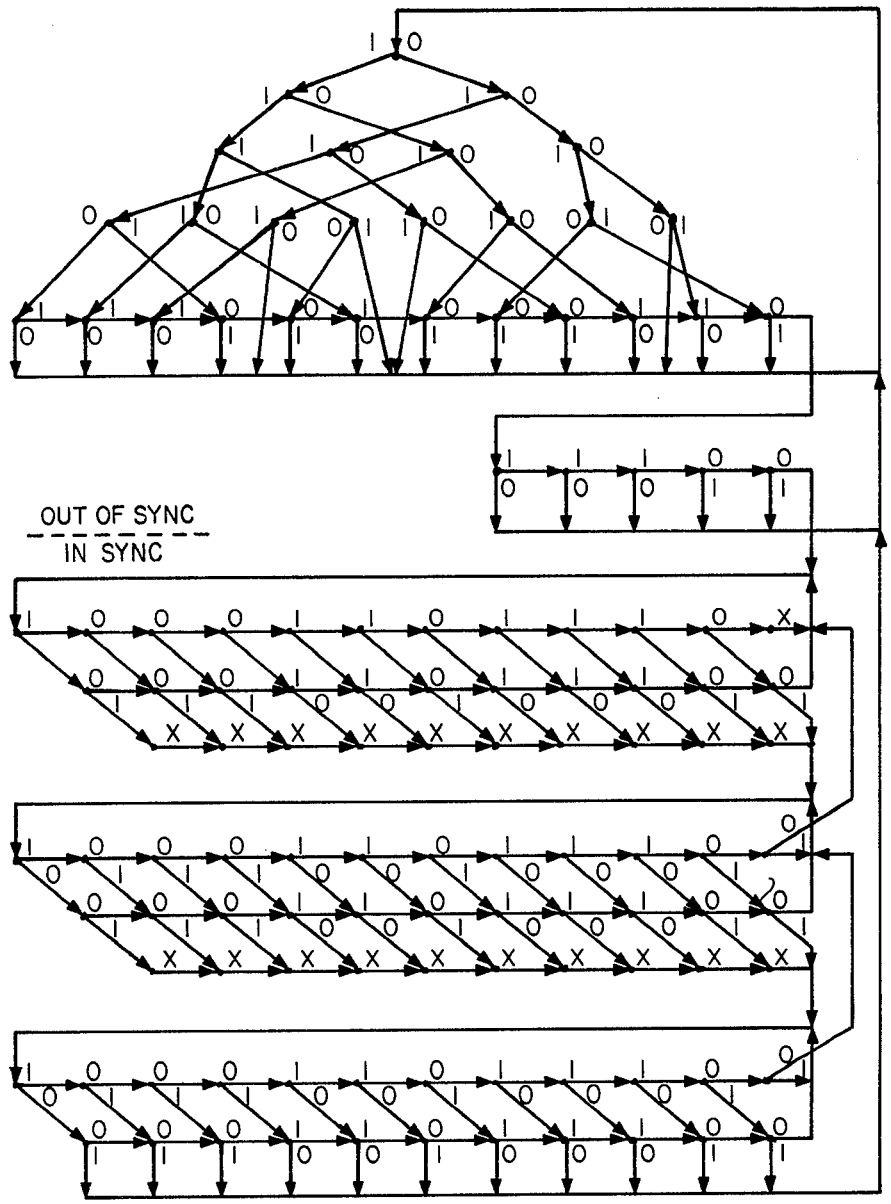
FIG. 6 is a state diagram for the alignment state machine included in the input processor of FIG. 5.

The alignment state machine 43 includes latches and programmable read only memories (PROMs) for respectively examining the pattern of bits occurring in corresponding bit positions of successive frames of each of the delayed signals on line 47 during frame synchronization pulse intervals defined by the sync timing signals SYNC0-SYNC3 on line 25e in relation to a predetermined bit pattern, and for respectively providing slip signals (SLIP) on four lines 48 to the ring buffers 39-42 for regulating the respective delays in accordance with such examination until the delayed signals are synchronized with the respective sync timing signals on line 25e. The state diagram for the alignment state machine 43 is shown in FIG. 6. The digit shown at each state transition represents the state of line 45 during the frame synchronization pulse interval.

Figure 7:
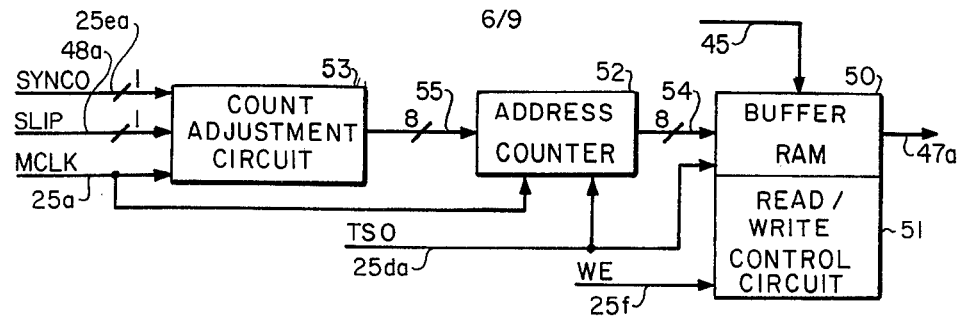
FIG. 7 is a block diagram of one of the ring buffers included in the input processor of FIG. 5.

Referring to FIG. 7, each ring buffer 39-42 includes a buffer RAM 50, a read/write control circuit 51, an address counter 52 and a count adjustment circuit 53. The timing signal lines in FIG. 7 are identified for the ring buffer 39, which delays the TDM input signal in time slot "0".

The buffer RAM 50 temporarily stores the received input signal that occurs on line 45 during time slot "0" in a variable number of successively addressed bit positions. The buffer RAM is addressed for storage and readout only during the time slot "0" defined by the time slot timing signal TS0 (FIG. 4c) on line 25da.

The read/write control circuit 51 responds to the WE control signal on line 25f by first reading the respectively delayed input signal from the buffer RAM 50 onto line 47a and then writing the respectively received input signal from line 45 into the buffer RAM 50 during each interval during which a bit position of the buffer RAM 50 is addressed.

The address counter 52 provides a variable count of addresses on eight lines 54 to the buffer RAM 50 for successively addressing the variable number of bit positions of the buffer RAM 50 repetitively at the bit position rate of the input signal as defined by the MCLK timing signal on line 25a. The address counter 52 is enabled for addressing the buffer RAM 50 only during time slot "0" as defined by the TS0 timing signal on line 25da. The address counter 52 has a capacity of 193 addresses, corresponding to the 192 data bit positions and the framing bit position in a TDM input signal. However, the address counter 52 does not normally count to its full capacity before recycling. The number of counts in each address cycle is controlled by the count adjustment circuit 53.

The count adjustment circuit 53 includes a counter that responds to each slip signal respectively provided on line 48a to the ring buffer 39 during time slot "0" for varying the count provided by the address counter 52 to thereby vary the number of bit positions in the buffer RAM 50 that are repetitively addressed. The counter of the count adjustment circuit also has a capacity of 193. The counter is incremented by the simultaneous occurrence of a slip signal on line 48a, the SYNC0 timing signal on line 25ea and the rising edge of the MCLK signal on line 25a; and, upon being incremented, provides a signal on eight lines 55 to the address counter 52 for incrementally decreasing the count at which the address counter 52 recycles.

The duration of the delay provided by the ring buffer 39 is determined by the count provided by the address counter 52, since such delay depends upon the number of data bit positions in the buffer RAM 50 that are addressed between the time when the received input signal from line 45 is stored in the buffer RAM 50 during one count cycle and the time when the stored input signal is read from the buffer RAM 50 onto line 47a during the following count cycle.

Referring again to FIG. 5, the XBUS selector/driver circuit 37 includes latches, decoders and a MUX for transferring the delayed time-division-multiplexed TDM signals on line 47 onto a selected line of the XBUS 12. The address of the selected XBUS line is provided to the XBUS selector driver circuit 37 over eight lines 56 from the XBUS select register 38.

The XBUS select register 38 includes latches and a logic circuit for registering the address of the selected XBUS line. The address of the selected XBUS line is provided from the controller in the control module C that controls the switching module S and is latched into the register 38 from the MDATA lines 24a in response to a write XBUS select register signal (WRXBS) from line 24d of the IMBUS 24. The register 38 may be read out to the controller over the MDATA lines 24a in response to a read XBUS select register signal (RDXBS) from line 24e of the IMBUS 24.

The address signals on MDATA lines 24a, the WRXBS signal on line 24d and the RDXBS signal on line 24e are provided to the XBUS select register 38 from the controller in the control module C via the MBUS 13 and the controller interface circuit 23.

The switching system of the present invention is embodied in the output processor 21 and the control subsystem 22.

Referring to FIG. 8, the output processor includes XBUS latches 58, a data RAM 59, a data RAM address selector 60, a data RAM read latches circuit 61, a read latch enable generator 62, a line address latch 63, an output data selector 64, an OBUS selector/driver circuit 65 and an OBUS select register 66.

Figure 9:
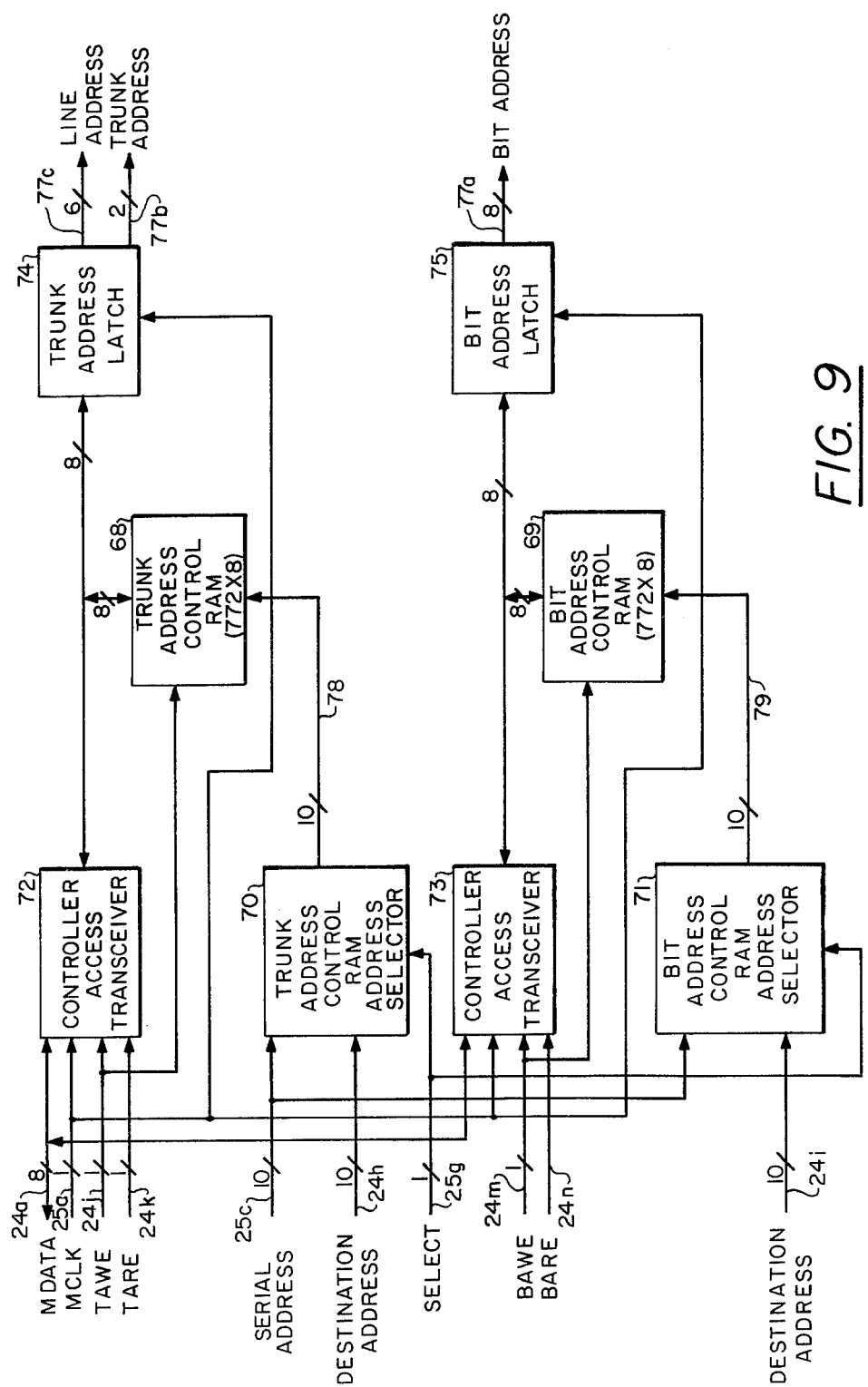
FIG. 9 is a block diagram of a first portion of the control subsystem included in the switching system of FIG. 2.

Referring to FIG. 9, the control subsystem includes a trunk address control RAM 68, a bit address control RAM 69, a trunk address control RAM address selector 70, a bit address control RAM address selector 71, a pair of controller access transceivers 72, 73, a trunk address latch 74 and a bit address latch 75.

Referring again to FIG. 8, the XBUS latches 58 latch the input signals from all thirty-six lines of the XBUS 12 in response to the rising edge of the MCLK timing signal from line 25a. During the write intervals, which are defined by the MCLK timing signal being high, the outputs of XBUS latches 58 are enabled; and during the read intervals, which are defined by the MCLK timing signal being low, the outputs of the XBUS latches 58 are inhibited.

The data RAM 59 includes 772 thirty-six-bit storage positions for storing an entire frame of all of the input signals provided from the XBUS 12 by the XBUS latches 58 during the write intervals. The data RAM 59 is enabled for storage during the write interval by the WE signal on line 25f.

The data RAM address selector 60 includes a MUX which selects serial write address signals from line 25c for addressing the 772 storage positions in the data RAM 59 during the write interval in accordance with the state of the SELECT signal on line 25g. During the read interval the SELECT signal on line 25g changes state and causes the data RAM address selector 60 to select a designated read address signal from lines 77a and 77b for addressing a selected storage position in the data RAM 59 corresponding to a selected originating channel corresponding to a selected data bit position in every frame of a selected input signal. The selected read and write address signals are provided by the selector 60 to the data RAM 59 over ten lines 76. Designated bit read address signals are provided to the selector 60 on eight lines 77a from the bit address control RAM 69 and designated trunk read address signals are provided to the selector 60 on two lines 77b from the trunk address control RAM 68 in the control subsystem 22 (FIG. 9).

Referring again to FIG. 9, the combination of the two control RAMS 68 and 69, store the designated read address signals for addressing the data RAM 59.

The designated read address signals that are stored in the control RAMs 68, 69 are provided on the eight MDATA lines 24a of the IMBUS 24 to the two controller access transceivers 72, 73.

The transceivers 72, 73 include latches and drivers. The transceiver 72 latches the two-bit designated trunk read address signal from the MDATA lines 24a in response to the rising edge of the MCLK timing signal on line 25a when enabled by the trunk address write enable signal (TAWE) on line 24j. A six-bit designated line read address signal for designating the line of the thirty-six output lines of the XBUS 14 that contains the originating channel input signal is combined with the two-bit designated trunk read address signal to constitute the eight-bit designated read address signal that is latched into the transceiver 72 from the MDATA line 24a.

The transceiver 73 latches the eight-bit designated bit read address signal from the MDATA lines 24a in response to the rising edge of the MCLK timing signal on line 25a when enabled by the bit address write enable signal (BAWE) on line 24m.

During the write intervals, the outputs of the transceivers 72, 73 to the respective control RAMs 68, 69 are enabled when the TAWE and BAWE signals are provided on lines 24j and 24m respectively; and during the read intervals, these outputs of the transceivers 72, 73 are inhibited in response to the MCLK signal on line 25a.

Each control RAM 68, 69 includes 772 eight-bit storage positions for storing the designated read address signals provided from the MDATA line 24a by the transceivers 72, 73. The trunk address control RAM 68 is enabled for storage during the write interval by the TAWE signal on line 24j. The bit address control RAM 69 is enabled for storage during the write interval by the BAWE signal on line 24m.

The address circuit for the control RAMs 68, 69 includes the trunk address control RAM address selector 70 and the bit address control RAM address selector 71.

The selector 70 includes a MUX, which during the write intervals selects the destination channel address signal from ten lines 24h for addressing the trunk address control RAM 68 for storing the designated line and trunk read address signal from lines 24a in the position of the control RAM 68 corresponding to the selected output line and the selected trunk position in every frame of a selected output signal corresponding to the selected destination channel indicated by the destination address signal on the lines 24h.

The selector 71 includes a MUX, which during the write intervals selects the destination channel address signal from ten lines 24i for addressing the bit address control RAM 68 for storing the designated bit read address signal from lines 24a in the position of the control RAM 69 corresponding to the selected bit positions in every frame of a selected output signal corresponding to the selected destination channel indicated by the destination address signals on the lines 24i.

During the read intervals the selectors 70 and 71 each select the serial address signals from lines 25c for addressing the storage positions of the respective control RAMs 68, 69 in a sequence corresponding to the sequence of data bit positions in every frame of the output signals. Whether the selectors 70, 71 select address signals from the serial address lines 25c or the respective destination address lines 24h, 24i depends upon the state of the SELECT signal on line 25g. The address signals selected by the selectors 70 and 71 are provided to the control RAMs 68 and 69 over ten lines 78 and ten lines 79 respectively.

During the read interval the contents of the addressed position in the trunk address control RAM 68 is provided by the transceiver 72 onto the MDATA lines 24a when the transceiver is enabled by a trunk address read enable signal (TARE) on line 24K and the contents of the addressed position in the bit address control RAM 69 is provided by the transceiver 73 onto the MDATA lines 24a when the transceiver 73 is enabled by a bit address read enable signal (BARE) on line 24n.

The designated read address signals on lines 24a, the destination address signals on lines 24h and 24i, the TAWE signal on line 24j, the TARE signal on line 24k, the BAWE signal on line 24m and the BARE signal 24n are all provided on the IMBUS 24 from the controller in the control module C via the MBUS 13 and the controller interface circuit 23.

The signals provided onto the MDATA lines 24a by the transceivers 72, 73 are provided to the controller in the control module C via the controller interface circuit 23 and the MBUS 13.

The trunk address latch 74 and the bit address latch 75 couple the control RAMs 68, 69 to the data RAM address selector 60 (FIG. 8) for providing the designated read address signal to the data RAM address selector 60 for causing data to be read from the data RAM 59 during intervals corresponding to the one or more selected data bit positions in every frame of the selected output signal corresponding to the one or more selected destination channels.

During the read intervals, the contents of the addressed storage position in the trunk address control RAM 68 are latched into the trunk address latch 74, which provides the designated trunk read address signal on lines 77b to the data RAM address selector 60 and a designated line selection address signal on six lines 77c to the line address latch 63 (FIG. 8).

Also during the read intervals, the contents of the addressed storage position in the bit address control RAM 69 are latched into the bit address latch 75, which provides the designated bit read address signal on lines 77a to the data RAM address selector 60. The operation of both the trunk address latch 74 and the bit address latch 75 is controlled in response to the MCLK signal on line 25a.

Referring again to FIG. 8, the data RAM read latches circuit 61 latches the data read from the data RAM into the one or more selected bit positions in every frame of the selected output signal. During read intervals the contents of the addressed storage position in the data RAM 59 is latched into the data RAM read latches circuit 61 in response to the MCLK timing signal on line 25a. There are thirty-six latches, a decoder and a logic circuit in the data RAM read latches circuit 61. The contents of eight of these latches are provided during the read intervals onto selected eight lines 80 to the output data selector 64 in response to a five-bit read latch enable signal provided to the data RAM read latches circuit 61 on five lines 81 from the read latch enable generator 62.

The read latch enable generator 62 includes a decoder and a logic circuit for providing the read latch enable signal on the lines 81 in response to a three-bit designated line read address signal provided on three lines 82 from the line address latch 63.

The line address latch 63 latches the six-bit designated line read address signal from the lines 77c in response to the rising edge of the MCLK timing signal on line 25a. Three bits of this six-bit designated line read address signal on the lines 77c are provided on the three lines 82 to the read latch enable generator 62 (as described above) and the remaining three bits are provided on three lines 83 to the output data line selector 64.

The output data line selector 64 includes a logic circuit and a decoder that responds to the three-bit line selection address signal on lines 83 by selecting the line of the eight lines 80 onto which data stored in the data RAM 59 from the XBUS line containing the originating channel input signal was provided by the data RAM latch 61. The output data selector 64 transfers the latched data from the selected line onto the line 84. The signal on line 84 is referred to as the data RAM output signal.

The selection circuit includes the OBUS selector/driver circuit 65 and the OBUS select register 66.

The selection circuit selects the line of the output bus 11 that contains the selected one or more destination channels in the selected one or more bit positions of the output signal on the selected output bus line and transfers the latched data read from the data RAM 59 onto the selected output bus line.

The OBUS selector driver circuit 65 includes latches, decoders and a MUX for transferring the data RAM output signal from line 84 onto a selected line of the OBUS 36 that contains the selected destination channel in the selected bit position of the output signal during the time slot corresponding to the selected destination channel. The OBUS selector driver circuit 65 is clocked by the MCLK timing signal on line 25a. The address of the selected OBUS line is provided to the OBUS selector driver circuit 65 over eight lines 85 from the OBUS select register 66.

The OBUS select register 66 includes latches and a logic circuit for registering the address of the selected OBUS line. The address of the selected OBUS line is provided from the controller in the control module C that controls the switching module S and is latched into the register 38 from the MDATA lines 24a in response to a write OBUS select register signal (WROBS) from line 24f of the IMBUS 24. The register 66 may be read out to the controller over the MDATA lines 24a in response to a read OBUS select register signal (RDOBS) from line 24g of the IMBUS 24.

The address signals on MDATA line 24a, the WROBS signal on line 24f and the RDOBS signal on line 24g are provided to the OBUS select register 66 from the controller in the control module C via the MBUS 13 and the controller interface circuit 24.

Although the foregoing has described the routing of data from one originating channel to one or more destination channels, it should be understood that such description also is applicable to the routing of data from several originating channels in different input signals on different lines of the XBUS 12 to several destination channels in different output signals on different output lines of the OBUS 11 during each frame of the data RAM output signals on line 84.

During the operation of the distributed digital exchange, it is necessary that the activity status and the break status of each communication link between an originating channel and a destination channel be monitored. Accordingly, the control subsystem 22 further includes a status monitoring system.

Referring to FIG. 10, the status monitoring system includes a status state machine 86, which includes a status latch 87, a status read only memory (ROM) 88 and a first status RAM 89. The status monitoring system further includes a second status RAM 90, a status input selector circuit 91, a status RAM address selector 92, and a controller address latch 93.

In the status state machine 86, the status ROM 88 is addressed by signals on eight lines 94 from the status latch 87, and provides a four-bit ROM output signal on four lines 95 to the first status RAM 89. The first status RAM 89 is addressed serially by the serial address signal on the ten lines 25c for both storage and readout. Readout of status ROM 88 and both readout from and storage in the first status RAM 89 are controlled in response to the WE timing signal on line 25f.

The status latch 87 responds to the rising edge of the MCLK signal on line 25a by latching the four-bit ROM output signal from the status RAM 89, the data RAM output signal from line 84, a "SAMPLE" signal from line 24p of the IMBUS 24 and two control reset signals from two lines 96a. The "SAMPLE" signal on line 24p is derived from the controller in the control module C and is provided via the MBUS 13, and the controller interface circuit 23. The "SAMPLE" signal includes a window pulse having a duration of an MCLK timing signal period and occurring once every 1024 frames. The control reset signals on the two lines 96a indicate whether the status state machine 86 is to be reset either upon restoration of power to the system or when a new calculation of status by the status state machine 86 is required.

The control reset signals on line 96a either are provided from the controller in the control module C via the MBUS 13, the controller interface circuit 23 and two of the four MDATA lines 24a or are recirculated on a corresponding pair of lines 97 from the status latch 87. During the read interval the latch provides the eight signals from lines 24p, 84, 95a and 96a on the eight lines 94 to address the status ROM 88.

Figure 11:
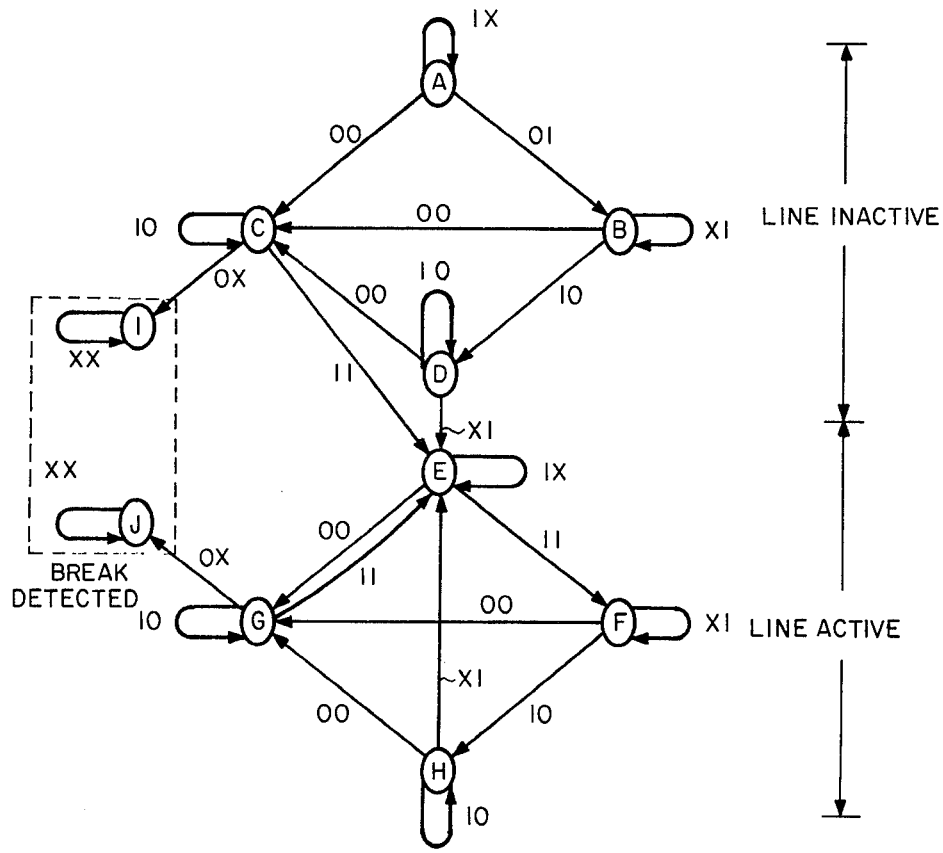
FIG. 11 is a state diagram for the status state machine included in the portion of the control subsystem shown in FIG. 10.

The state diagram for the status state machine 86 is shown in FIG. 11. Upon reset the status state machine 86 begins in state "A" shown in the state diagram. Of the two digits shown for each state transition, the first digit represents the state of the SAMPLE signal on line 24p and the second digit represents the state of the data RAM output signal on line 84.

The status state machine 86 examines the pattern of bits occurring in corresponding bit positions of successive frames in the data RAM output signal on line 84 for each of the bit positions of the data RAM output signal in relation to a first predetermined bit pattern stored in the status ROM 88 to determine the activity status of the output channel corresponding to each bit position in the data RAM output signal on line 84, and in relation to a second predetermined bit pattern also stored in the status ROM 88 for detecting a break status for the output channel corresponding to each bit position in the data RAM output signal. The status ROM 88 provides an activity status signal and a break detect signal respectively on two lines 95a of the four lines 95 in accordance with such examination.

The activity status signal and the break detect signal on the two lines 95a are stored in the second status RAM 90. The second status RAM 90 also stores the two control reset signals provided on the two lines 97 from the status latch 87. The second status RAM 90 is addressed for storage by the serial address signal provided on the ten lines 25c, and is addressed for readout by a selected ten-bit status RAM address signal provided on ten IMBUS lines 24s via the controller interface circuit 23 and the MBUS 13 from the controller in the control module C.

The status RAM address selector 92 is a MUX for providing the respective address signals to the second status RAM 90 from either the ten ICBUS lines 25c or the ten IMBUS lines 24s in accordance with the state of the SELECT timing signal on line 25g.

The second status RAM 90 serves as a buffer for accessing the status signals on the two lines 97a for access to the controller in the control module C without interfering with the calculations being made by the status state machine 86.

The controller access latch 93 responds to the rising edge of the MCLK timing signal on line 25a by latching the contents of the second status RAM 90 and further responds to the status read enable signal (STRE) on IMBUS line 24t by providing the contents of the second status RAM 90 on four lines 98 to the controller in the control module C via four of the MDATA lines 24a, the controller interface circuit 23 and the MBUS 13.

The status input selector circuit 91 includes a MUX, a logic circuit and a line driver. The selector circuit 91 is controlled by a DATA SELECT signal on line 24r to select either the signal on lines 95a and 97 or the control reset signals from the MDATA lines 24a for provision onto the four lines 96. A status write enable signal (STWE) is provided on IMBUS line 24g to enable the signals on the lines 96 to be stored in the second status RAM 90.

The STWE signal on line 24g alternatively blocks signal flow through the status input selector circuit 91 while the contents of the second status RAM 90 are being read out and provided on line 98 for provision to the controller in the control module C.

The STRE signal on line 24t and the STWE signal on line 24g are provided by the controller C via the MBUS 13 and the controller interface circuit 23.

We claim:

1. A switching system for routing data from any selected data bit position in a frame of a time-division-multiplexed input signal to one or more selected data bit positions in a frame of a time-division-multiplexed output signal, comprising a data RAM for storing the input signal during write intervals defined by a timing signal;

address selection means for selecting write address signals for addressing positions in the data RAM for storing data from each data bit position in every frame of the input signal and for providing said selected write address signals to address the data RAM during the write intervals, and for selecting a designated read address signal for addressing a selected position in the data RAM corresponding to a selected data bit position in every frame of the input signal, and for providing said designated read address signal to address the data RAM during a read interval defined by the timing signal to thereby read data from the data RAM;

a control RAM for storing the designated read address signal;

means for addressing the control RAM for storing the designated read address signal in one or more positions corresponding to one or more selected data bit positions in every frame of the output signal, and for addressing the positions of the control RAM for read out in a sequence corresponding to the sequence of data bit positions in every frame of the output signal;

means for coupling the control RAM to the address selection means for providing the designated read address signal to the address selection means for causing data to be read from the data RAM during intervals corresponding to the one or more selected data bit positions in every frame of the output signal; and a read latch for latching the data read from the data RAM into the one or more selected data bit positions in every frame of the output signal.

2. A switching system according to claim 1, further comprising means coupled to the data RAM for examining the pattern of bits occurring in corresponding bit positions of successive frames in the output signal for each of the bit positions of the output signal in relation to a first predetermined bit pattern for determining the activity status of each bit position in the output signal, and in relation to a second predetermined bit pattern for detecting a break status for each bit position in the output signal, and for providing an activity status signal and a break detect signal respectively in accordance with said examination; and a status RAM for storing the activity status signal and the break detect signal.

3. A distributed digital exchange for completing a communications link between a selected originating channel and one or more selected destination channels, comprising an input bus containing a given number of input lines, with each input line for conveying a time-division-multiplexed input signal, with each data bit position of every frame of each input signal defining a discrete originating channel;

a clock system for providing timing signals for defining frames and bit positions corresponding to the frames and bit positions of the input signals;

an exchange bus containing at least said given number of lines for conveying the input signals;

input processing means for receiving the input signals, for synchronizing the input signals in response to the timing signals and for transferring each received input signal from a selected line of the input bus to a selected line of the exchange bus;

an output bus containing at least said given number of output lines, with each output line for conveying a time-division-multiplexed output signal, with each data bit position of every frame of each output signal defining a discrete destination channel;

a plurality of switching systems, each of which comprises means for routing data from any selected data bit position in a frame of any selected time-division-multiplexed input signal on a selected line of the exchange bus to one or more selected data bit positions in a frame of any selected time-division-multiplexed output signal; and control means for controlling said selections.

4. A distributed digital exchange according to claim 3, wherein each of the switching systems comprises a data RAM coupled to the exchange bus for storing all of the input signals from all of the exchange bus lines during write intervals defined by a first timing signal;

address selection means for selecting write address signals for addressing positions in the data RAM for storing data from each data bit position in every frame of each input signal and for providing said selected write address signals to address the data RAM during the write intervals, and for selecting a designated read address signal for addressing a selected position in the data RAM corresponding to a selected originating channel corresponding to a selected data bit position in every frame of a selected input signal, and for providing said designated read address signal to address the data RAM during a read interval defined by the first timing signal to thereby read data from the data RAM;

a control RAM for storing the designated read address signal;

means for addressing the control RAM for storing the designated read address signal in one or more positions corresponding to one or more selected data bit positions in every frame of a selected output signal corresponding to one or more selected destination channels, and for addressing the positions of the control RAM for read out in a sequence corresponding to the sequence of data bit positions in every frame of the output signals;

means for coupling the control RAM to the address selection means for providing the designated read address signal to the address selection means for causing data to be read from the data RAM during intervals corresponding to the one or more selected data bit positions in every frame of the selected output signal;

a read latch for latching the data read from the data RAM into the one or more selected data bit positions in every frame of the selected output signal; and means for selecting the line of the output bus that contains the selected one or more destination channels in the selected one or more bit positions of the output signal on the selected output bus line and for transferring the latched data read from the data RAM onto the selected output bus line; and wherein the control means are adapted for controlling said designations.

5. A distributed digital exchange according to claim 4, further comprising means coupled to each data RAM for examining the pattern of bits occurring in corresponding bit positions of successive frames in the output signal for each of the bit positions of the output signal in relation to a first predetermined bit pattern for determining the activity status of the output channel corresponding to each bit position in the output signal, and in relation to a second predetermined bit pattern for detecting a break status for the output channel corresponding to each bit position in the output signal, and for providing an activity status signal and a break detect signal respectively in accordance with said examination; and a status RAM for storing the activity status signal and the break detect signal.

6. A distributed digital exchange according to claim 3, wherein the input processing means for synchronizing each input signal includes a ring buffer for delaying the input signal received from the selected input line and for transferring the delayed input signal to the selected line of the exchange bus; and an alignment state machine for examining the pattern of bits occurring in corresponding bit positions of successive frames of the delayed signal during frame synchronization pulse intervals defined by a second timing signal in relation to a predetermined bit pattern, and for providing slip signals to the ring buffer for regulating said delay in accordance with said examination until the delayed signal is synchronized with the second timing signal.

7. A distributed digital exchange according to claim 6, wherein the ring buffer includes a buffer RAM for temporarily storing the received input signal in a variable number of successively addressed bit positions;

means for reading the delayed input signal from the buffer RAM and then writing the received input signal in the buffer RAM during each interval during which a bit position of the buffer RAM is addressed;

an address counter for providing a variable count of addresses for successively addressing the variable number of bit positions of the buffer RAM repetitively at the bit position rate of the input signal as defined by the first timing signal; and means responsive to each slip signal for varying the count provided by the address counter to thereby vary the number of bit positions in the buffer RAM that are respectively addressed;

whereby the delay provided by the ring buffer is determined by the count provided by the address counter.

8. A distributed digital exchange for completing a communications link between a selected originating channel and one or more selected destination channels, comprising an input bus containing a given number of input lines, with each input line for conveying a time-division-multiplexed plurality of time-division-multiplexed input signals, with each data bit position of every frame of each input signal defining a discrete originating channel;

a clock system for providing timing signals for defining frames and bit positions corresponding to the frames and bit positions of the input signals;

an exchange bus containing at least said given number of lines for conveying the input signals;

input processing means for receiving the input signals, for synchronizing the input signals in response to the timing signals and for transferring each received plurality of input signals from a selected line of the input bus to a selected line of the exchange bus;

an output bus containing at least said given number of output lines, with each output line for conveying a time-division-multiplexed output signal, with each data bit position of every frame of each output signal defining a discrete destination channel;

a plurality of switching systems, each of which comprises means for routing data from any selected data bit position in a frame of any selected time-division-multiplexed input signal on a selected line of the exchange bus to one or more selected data bit positions in a frame of any selected time-division-multiplexed output signal; and control means for controlling said selections.

9. A distributed digital exchange according to claim 8, wherein each of the switching systems comprises
a data RAM coupled to the exchange bus for storing all of the input signals from all of the exchange bus lines during write intervals defined by a first timing signal;

address selection means for selecting write address signals for addressing positions in the data RAM for storing data from each data bit position in every frame of each input signal and for providing said selected write address signals to address the data RAM during the write intervals, and for selecting a designated read address signal for addressing a selected position in the data RAM corresponding to a selected originating channel corresponding to a selected data bit position in every frame of a selected input signal, and for providing said designated read address signal to address the data RAM during a read interval defined by the first timing signal to thereby read data from the data RAM;

a control RAM for storing the designated read address signal;

means for addressing the control RAM for storing the designated read address signal in one or more positons corresponding to one or more selected data bit positions in every frame of a selected output signal corresponding to one or more selected destination channels, and for addressing the positions of the control RAM for read out in a sequence corresponding to the sequence of data bit positions in every frame of the output signals;

means for coupling the control RAM to the address selection means for providing the designated read address signal to the address selection means for causing data to be read from the data RAM during intervals corresponding to the one or more selected data bit positions in every frame of the selected output signal;

a read latch for latching the data read from the data RAM into the one or more selected data bit positions in every frame of the selected output signal; and means for selecting the line of the output bus that contains the selected one or more destination channels in the selected one or more bit positions of the output signal on the selected output bus line and for transferring the latched data read from the data RAM onto the selected output bus line; and wherein the control means are adapted for controlling said designations.

10. A distributed digital exchange according to claim 9, further comprising means coupled to each data RAM for examining the pattern of bits occurring in corresponding bit positions of successive frames in the output signal for each of the bit positions of the output signal in relation to a first predetermined bit pattern for determining the activity status of the output channel corresponding to each bit position in the output signal, and in relation to a second predetermined bit pattern for detecting a break status for the output channel corresponding to each bit position in the output signal and for providing an activity status signal and a break detect signal respectively in accordance with said examination; and a status RAM for storing the activity status signal and the break detect signal.

11. A distributed digital exchange according to claim 8, wherein the input processing means for synchronizing each plurality of input signals received from an input line includes a plurality of ring buffers corresponding to the plurality of input signals for respectively delaying each of the plurality of input signals received from the selected input line for transferring the respectively delayed input signals to the selected line of the exchange bus; and an alignment state machine for respectively examining the pattern of bits occurring in corresponding bit positions of successive frames of each of the delayed signals during frame synchronization pulse intervals defined by a second timing signal in relation to a predetermined bit pattern, and for respectively providing slip signals to the ring buffers for regulating said respective delays in accordance with said examination until the delayed signals are synchronized with the second timing signal.

12. A distributed digital exchange according to claim 11, wherein each ring buffer includes
- a buffer RAM for temporarily storing the respectively received input signal in a variable number of successively addressed bit positions;
- means for reading the respectively delayed input signal from the buffer RAM and then writing the respectively received input signal in the buffer RAM during each interval during which a bit position of the buffer RAM is addressed;
- an address counter for providing a variable count of addresses for successively addressing the variable number of bit positions of the buffer RAM repetitively at the bit position rate of the input signal as defined by the first timing signal; and
- means responsive to each slip signal respectively provided to the ring buffer for varying the count provided by the address counter to thereby vary the number of bit positions in the buffer RAM that are repetitively addressed;
- whereby the delay provided by the ring buffer is determined by the count provided by the address counter.

13. An input processor for synchronizing a time-division-multiplexed input signal received from an input line in response to timing signals that define frame and data bit positions, comprising
- a ring buffer for delaying the received input signal; and
- an alignment state machine for examining the pattern of bits occurring in corresponding bit position of successive frames of the delayed signal during frame synchronization pulse intervals defined by a first timing signal in relation to a predetermined bit pattern, and for providing slip signals to the ring buffer for regulating said delay in accordance with said examination until the delayed signal is synchronized with the first timing signal;
- wherein the ring buffer includes
- a buffer RAM for temporarily storing the received input signal in a variable number of successively addressed bit positions;
- means for reading the delayed input signal from the buffer RAM and then writing the received input signal in the buffer RAM during each interval during which a bit position of the buffer RAM is addressed;
- an address counter for providing a variable count of addresses for successively addressing the variable number of bit positions of the buffer RAM repetitively at the bit position rate of the input signal as defined by a second timing signal; and
- means responsive to each slip signal for varying the count provided by the address counter to thereby vary the number of bit positions in the buffer RAM that are repetitively addressed;
- whereby the delay provided by the ring buffer is determined by the count provided by the address counter.

14. An input processor for synchronizing a time-division-multiplexed plurality of time-division-multiplexed input signals received from an input line in response to timing signals that define frame and data bit positions, comprising
- a plurality of ring buffers corresponding to the plurality of input signals for respectively delaying each of the plurality of input signals received from the input line; and
- an alignment state machine for respectively examining the pattern of bits occurring in corresponding bit positions of successive frames of each of the delayed signals during frame synchronization pulse intervals defined by a first timing signal in relation to a predetermined bit pattern, and for respectively providing slip signals to the ring buffers for regulating said respective delay in accordance with said examination until the delayed signals are syncrhonized with the first timing signal; wherein each ring buffer includes
- a buffer RAM for temporarily storing the respectively received input signals in a variable number of successively addressed bit positions;
- means for reading the respectively delayed input signal from the buffer RAM and then writing the respectively received input signal in the buffer RAM during each interval during which a bit position of the buffer RAM is addressed;
- an address counter for providing a variable count of addresses for successively addressing the variable number of bit positions of the buffer RAM repetitively at the bit position rate of the input signal as defined by a second timing signal; and
- means responsive to each slip signal respectively provided to the ring buffer for varying the count provided by the address counter to thereby vary the number of bit positions in the buffer RAM that are repetitively addressed;
- whereby the delay provided by the ring buffer is determined by the count provided by the address counter.

* * * * *